(12) United States Patent
Tsai et al.

(10) Patent No.: US 7,379,292 B2
(45) Date of Patent: May 27, 2008

(54) ELECTRONIC DEVICE

(75) Inventors: Chu-Chia Tsai, Taipei (TW); Hsiu-Wei Yeh, Taipei (TW)

(73) Assignee: Wistron Corp., Taipei Hsien (TW)

( * ) Notice: Subject to any disclaimer, the term of this patent is extended or adjusted under 35 U.S.C. 154(b) by 426 days.

(21) Appl. No.: 11/192,795

(22) Filed: Jul. 29, 2005

(65) Prior Publication Data

US 2006/0245153 A1 Nov. 2, 2006

(30) Foreign Application Priority Data

Apr. 29, 2005 (TW) ............................... 94206840 U

(51) Int. Cl.
*H05K 5/00* (2006.01)
*H05K 7/00* (2006.01)
*G06F 1/16* (2006.01)

(52) U.S. Cl. ....................... 361/681; 361/679; 361/683

(58) Field of Classification Search ................ 361/681, 361/679, 683
See application file for complete search history.

(56) References Cited

U.S. PATENT DOCUMENTS

| | | | | |
|---|---|---|---|---|
| 6,275,376 | B1 * | 8/2001 | Moon ........................... | 361/683 |
| 6,498,721 | B1 * | 12/2002 | Kim ............................. | 361/681 |
| 7,055,218 | B2 * | 6/2006 | Lu et al. ....................... | 16/367 |
| 7,123,472 | B2 * | 10/2006 | Huang et al. ................ | 361/681 |
| 7,189,023 | B2 * | 3/2007 | Kang et al. .................. | 403/119 |
| 2004/0082202 | A1 * | 4/2004 | Obermeyer ..................... | 439/6 |
| 2004/0139579 | A1 * | 7/2004 | Su .............................. | 16/351 |
| 2004/0228081 | A1 * | 11/2004 | Lee ............................ | 361/683 |
| 2004/0253841 | A1 * | 12/2004 | Obermeyer ................... | 439/13 |
| 2005/0091431 | A1 * | 4/2005 | Olodort et al. ............... | 710/72 |
| 2005/0102799 | A1 * | 5/2005 | Huang .......................... | 16/367 |
| 2005/0125570 | A1 * | 6/2005 | Olodort et al. ............... | 710/15 |
| 2006/0117530 | A1 * | 6/2006 | Lu et al. ....................... | 16/342 |

* cited by examiner

*Primary Examiner*—Lisa Lea-Edmonds
*Assistant Examiner*—Anthony M Haughton
(74) *Attorney, Agent, or Firm*—Quintero Law Office

(57) ABSTRACT

An electronic device. A fixed base is fixed to a host. A rotating base is rotatably connected to the fixed base and includes a first pivot and a second pivot. The first pivot is disposed in the fixed base and separated from the second pivot. The central axis of the first pivot is perpendicular to that of the second pivot. The rotating base rotates in a first direction with respect to the fixed base by way of the first pivot. A monitor is rotatably connected to the rotating base. The second pivot of the rotating base is disposed in the monitor. The monitor rotates in a second direction with respect to the rotating base by way of the second pivot. The central rotating axis of the second direction is perpendicular to that of the first direction.

16 Claims, 5 Drawing Sheets

ELECTRONIC DEVICE

BACKGROUND

The invention relates to an electronic device, and in particular to a notebook computer with an LCD monitor capable of rotation beside a host.

Notebook computers often have reduced size due to considerations of portability. The size of an LCD monitor is reduced corresponding to the reduced size of the notebook computer. An additional and relatively large monitor can often be connected to the notebook computer in residence or offices, serving as an operating interface. Accordingly, the LCD monitor of the notebook computer is often unused in residence or offices.

Moreover, enhanced windows-based operating systems often provide function for multiple monitors. Thus, connecting other monitors to a notebook computer with an LCD monitor in a more convenient manner is increasingly critical.

Hence, there is a need for an improved notebook computer in which an LCD monitor is capable of detachable rotation with respect to a host. When additional monitors are connected to the host or multiple monitors are used, the LCD monitor can rotate to one side of the host, facilitating operation thereof.

SUMMARY

Accordingly, an exemplary embodiment of the invention provides an electronic device comprising a host, a fixed base, a rotating base, and a monitor. The fixed base is fixed to the host. The rotating base is rotatably connected to the fixed base and comprises a first pivot and a second pivot. The first pivot is disposed in the fixed base and separated from the second pivot. The central axis of the first pivot is perpendicular to that of the second pivot. The rotating base rotates in a first direction with respect to the fixed base by way of the first pivot. The monitor is rotatably connected to the rotating base. The second pivot of the rotating base is disposed in the monitor. The monitor rotates in a second direction with respect to the rotating base by way of the second pivot. The central rotating axis of the second direction is perpendicular to that of the first direction.

The electronic device further comprises a first positioning member and a second positioning member. The first positioning member fits on the second pivot of the rotating base and is fixed to the monitor. The second positioning member fits on and is fixed to the second pivot of the rotating base and abuts the first positioning member. The first and second positioning members position the rotating position and angle of the monitor when the monitor rotates in the second direction with respect to the rotating base by way of the second pivot.

The first positioning member comprises a plurality of recesses. The second positioning member comprises at least one protrusion. One of the recesses selectively engages the protrusion when the monitor rotates in the second direction with respect to the rotating base by way of the second pivot.

The recesses are circularly arranged on the first positioning member.

The first positioning member comprises at least one protrusion. The second positioning member comprises a plurality of recesses. The protrusion selectively engages one of the recesses when the monitor rotates in the second direction with respect to the rotating base by way of the second pivot.

The recesses are circularly arranged on the second positioning member.

The rotating base is hollow. The monitor is electrically connected to the host by way of a signal cable passing through the rotating base.

The second pivot of the rotating base is hollow. The monitor is electrically connected to the host by way of the signal cable passing through the second pivot and rotating base.

The electronic device further comprises a holding washer and a nut. The holding washer fits on the second pivot of the rotating base and is adjacent to the second positioning member. The nut is screwed to the second pivot of the rotating base and abuts the holding washer.

The fixed base comprises a pivot hole in which the first pivot of the rotating base is disposed.

The electronic device further comprises a shield fitted on the second pivot of the rotating base. The shield is disposed between the rotating base and the monitor and fixed to the monitor.

The monitor comprises an LCD monitor, and the electronic device comprises a notebook computer.

DESCRIPTION OF THE DRAWINGS

The invention can be more fully understood by reading the subsequent detailed description and examples with references made to the accompanying drawings, wherein.

DETAILED DESCRIPTION

Figure 1:
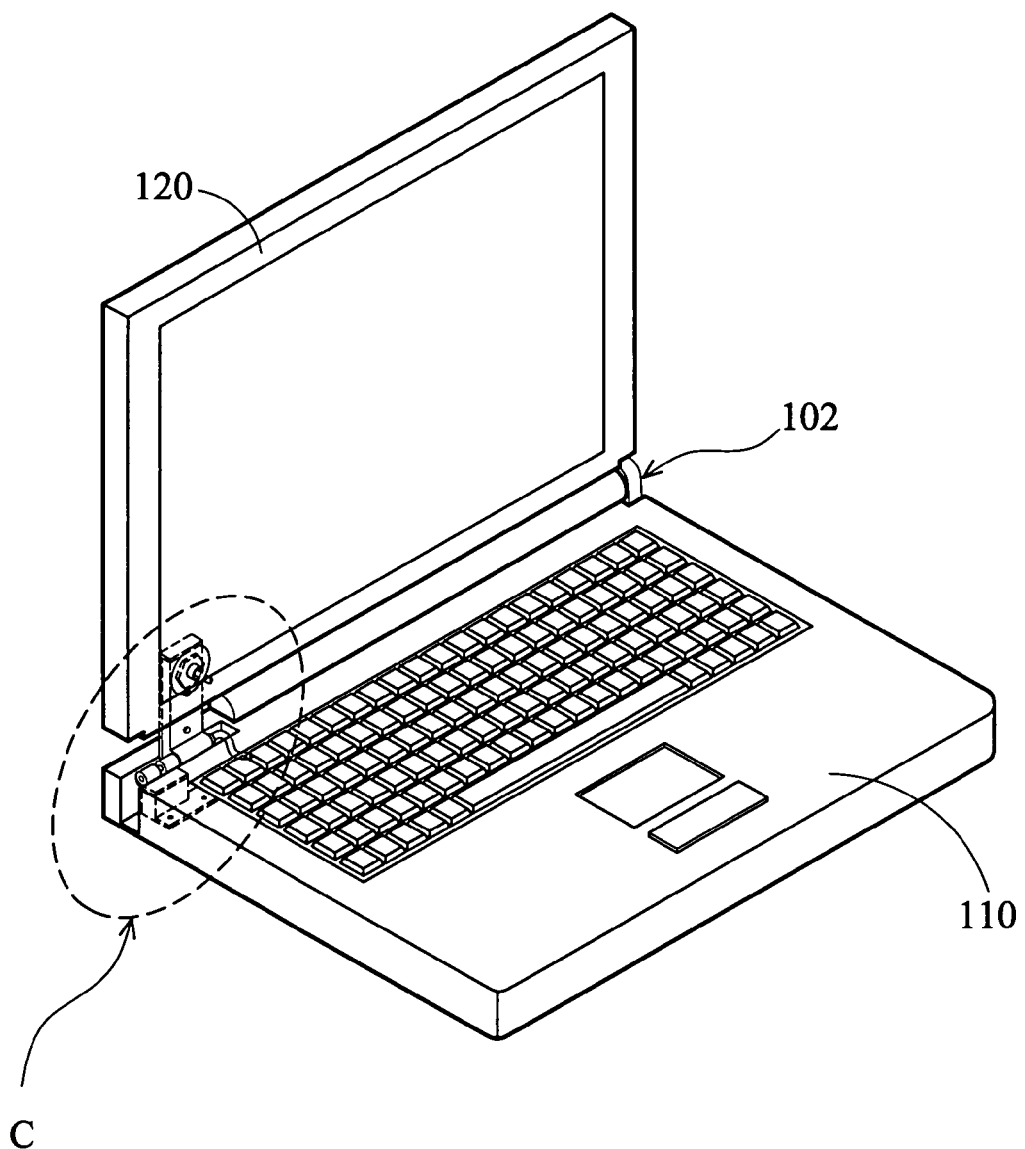
FIG. 1 is a schematic perspective view of a notebook computer (electronic device) of the invention.

Referring to FIG. 1, the notebook computer (electronic device) 100 comprises a host 110 and an LCD monitor 120. The LCD monitor 120 is connected to the host 110 by means of a release/lock hinge 102 disposed on one end thereof, rotating with respect to the host 110. The release/lock hinge 102 may be a conventional structure. The LCD monitor 120 can rotatably open from and close onto the host 110 by way of the release/lock hinge 102. When a button (not shown) of the release/lock hinge 102 is pressed, one end of the LCD monitor 120 can be separated from the release/lock hinge 102 (or host 110).

Figure 2:
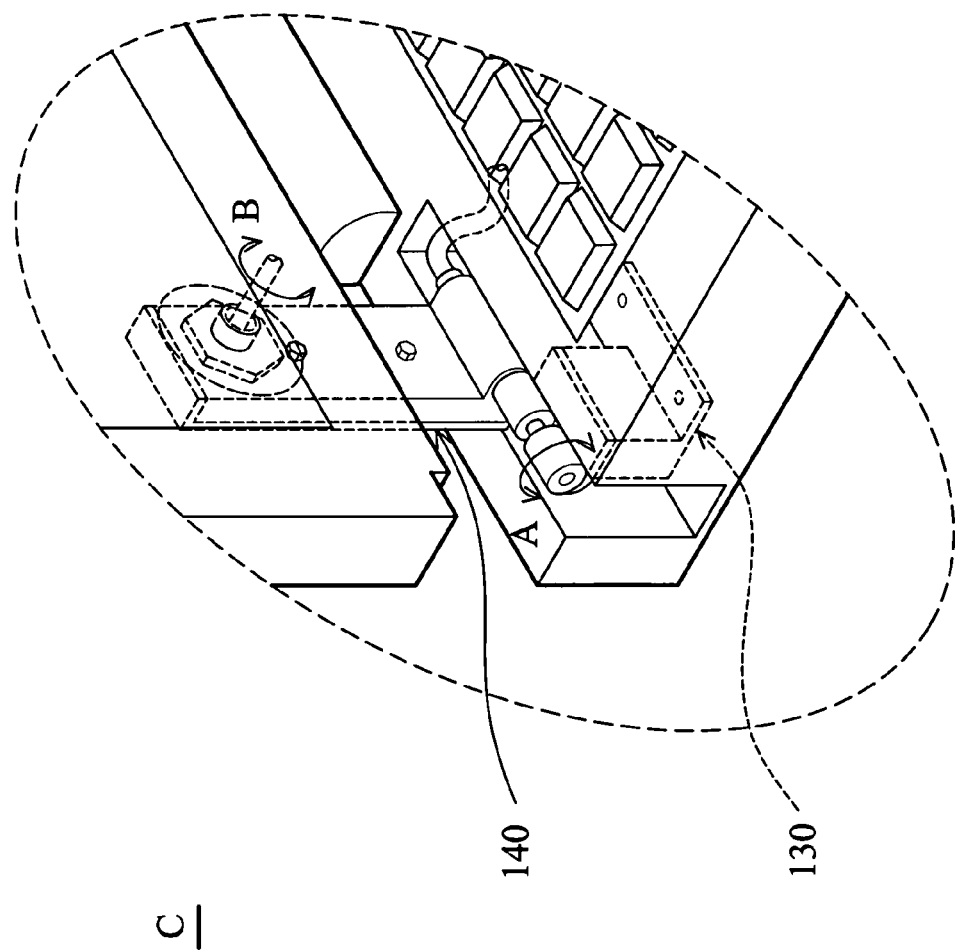
FIG. 2 is a partial enlarged view of FIG. 1.
Figure 3:
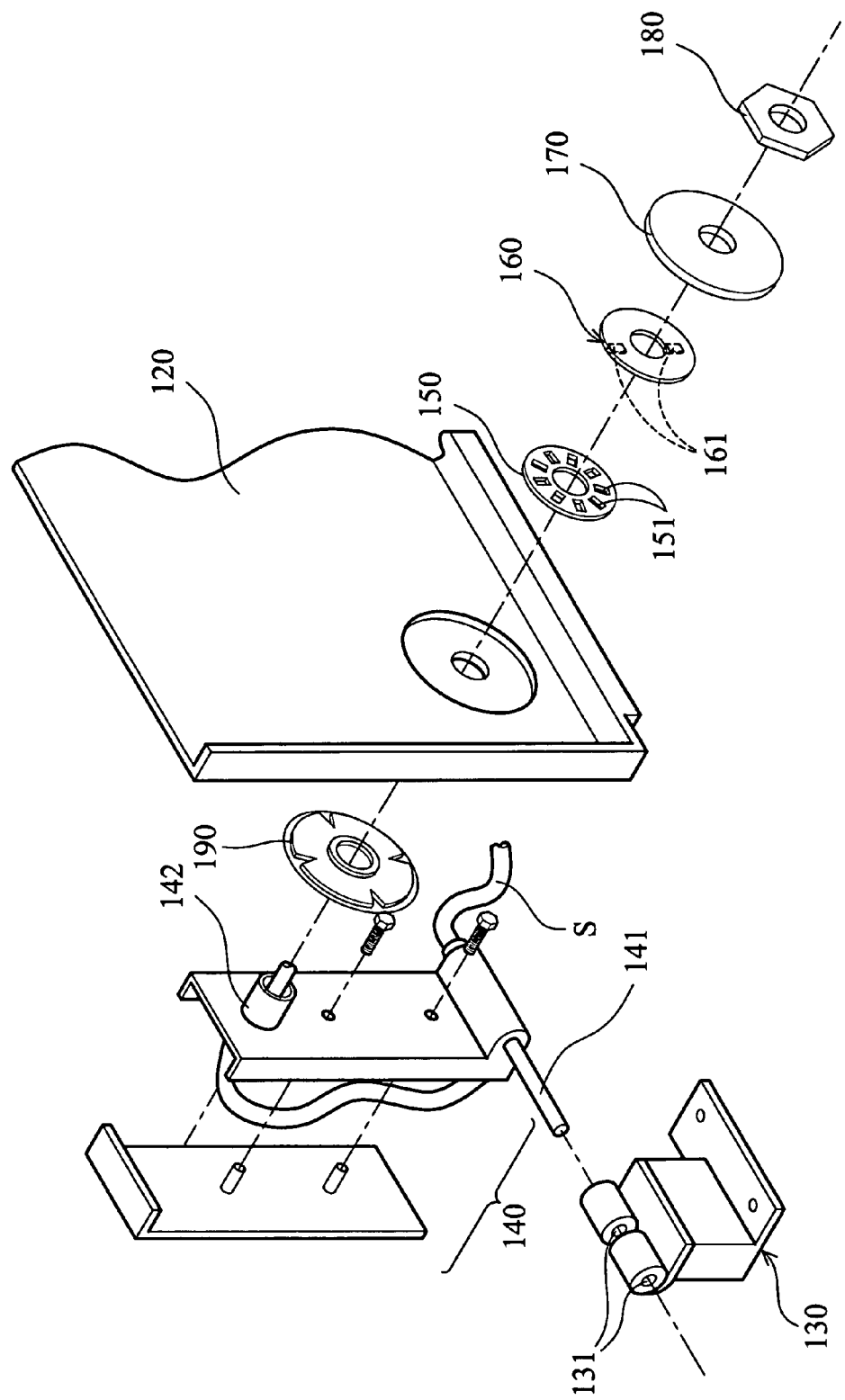
FIG. 3 is an exploded perspective view of FIG. 2.

Referring to FIG. 2 and FIG. 3, the notebook computer 100 comprises a fixed base 130, a rotating base 140, a first positioning member 150, a second positioning member 160, a holding washer 170, a nut 180, and a shield 190.

The fixed base 130 is fixed to the host 110. Specifically, as shown in FIG. 1 and FIG. 2, the fixed base 130 is fixed to one corner of the host 110. Additionally, the fixed base 130 comprises two pivot holes 131.

The rotating base 140 is rotatably connected to the fixed base 130. Specifically, the rotating base 140 comprises a first pivot 141 and a second pivot 142. The first pivot 141 is disposed in the pivot holes 131 of the fixed base 130. The first pivot 141 is separated from the second pivot 142. The central axis of the first pivot 141 is perpendicular to that of the second pivot 142. Accordingly, the rotating base 140 can rotate in a first direction A with respect to the fixed base 130 by way of the first pivot 141. Moreover, as shown in FIG. 3, the rotating base 140 and second pivot 142 thereof are hollow.

The LCD monitor 120 is rotatably connected to the rotating base 140. Specifically, the second pivot 142 of the rotating base 140 is disposed in the LCD monitor 120, such that the LCD monitor 120 can rotate in a second direction B with respect to the rotating base 140 by way of the second pivot 142. Specifically, the central rotating axis of the second direction B is perpendicular to that of the first direction A. Moreover, the LCD monitor 120 is electrically connected to the host 110 by way of a signal cable S passing through the rotating base 140 and second pivot 142 thereof.

The first positioning member 150 fits on the second pivot 142 of the rotating base 140 and is fixed to the LCD monitor 120. The second positioning member 160 fits on and is fixed to the second pivot 142 of the rotating base 140 and abuts the first positioning member 150. The first positioning member 150 and second positioning member 160 can position the rotating position and angle of the LCD monitor 120. Specifically, the first positioning member 150 comprises a plurality of recesses 151 circularly arranged thereon. The second positioning member 160 comprises at least one protrusion 161. Accordingly, when the LCD monitor 120 rotates in the second direction B with respect to the rotating base 140 by way of the second pivot 142, the first positioning member 150 rotates with the LCD monitor 120 as fixed thereto, and the second positioning member 160 remains stationary as fixed to the second pivot 142. One of the recesses 151 on the first positioning member 150 selectively engages the protrusion 161 of the second positioning member 160, thereby positioning the rotating position and angle of the LCD monitor 120. Moreover, the aforementioned recesses 151 and protrusion 161 are not limited to being formed on the first positioning member 150 and second positioning member 160, respectively. Namely, a plurality of recesses and a protrusion can alternatively and respectively be formed on the second positioning member 160 and first positioning member 150, achieving the same effect of positioning the rotating position and angle of the LCD monitor 120. Further, the first positioning member 150 and second positioning member 160 may respectively be modified to comprise a recess and a plurality of protrusions, or the recess and protrusions may be selectively formed on the second positioning member 160 and first positioning member 150, also achieving the same effect of positioning the rotating position and angle of the LCD monitor 120.

The holding washer 170 fits on the second pivot 142 of the rotating base 140 and is adjacent to the second positioning member 160. The nut 180 is screwed to the second pivot 142 of the rotating base 140 and abuts the holding washer 170. Accordingly, the LCD monitor 120 can smoothly rotate on the second pivot 142.

The shield 190 fits on the second pivot 142 of the rotating base 140. Specifically, the shield 190 is disposed between the rotating base 140 and the LCD monitor 120 and is fixed to the LCD monitor 120. In this embodiment, the shield 190 presents an aesthetically pleasing appearance of the LCD monitor 120.

The following description is directed to operation of the LCD monitor 120 and host 110 of the notebook computer 100.

As shown in FIG. 1, when connected to the host 110 by means of the release/lock hinge 102, the LCD monitor 120 can rotate only in the first direction A with respect to the fixed base 130 by way of the first pivot 141 of the rotating base 140. Namely, the LCD monitor 120 can only rotatably open from and close onto the host 110.

Figure 4:
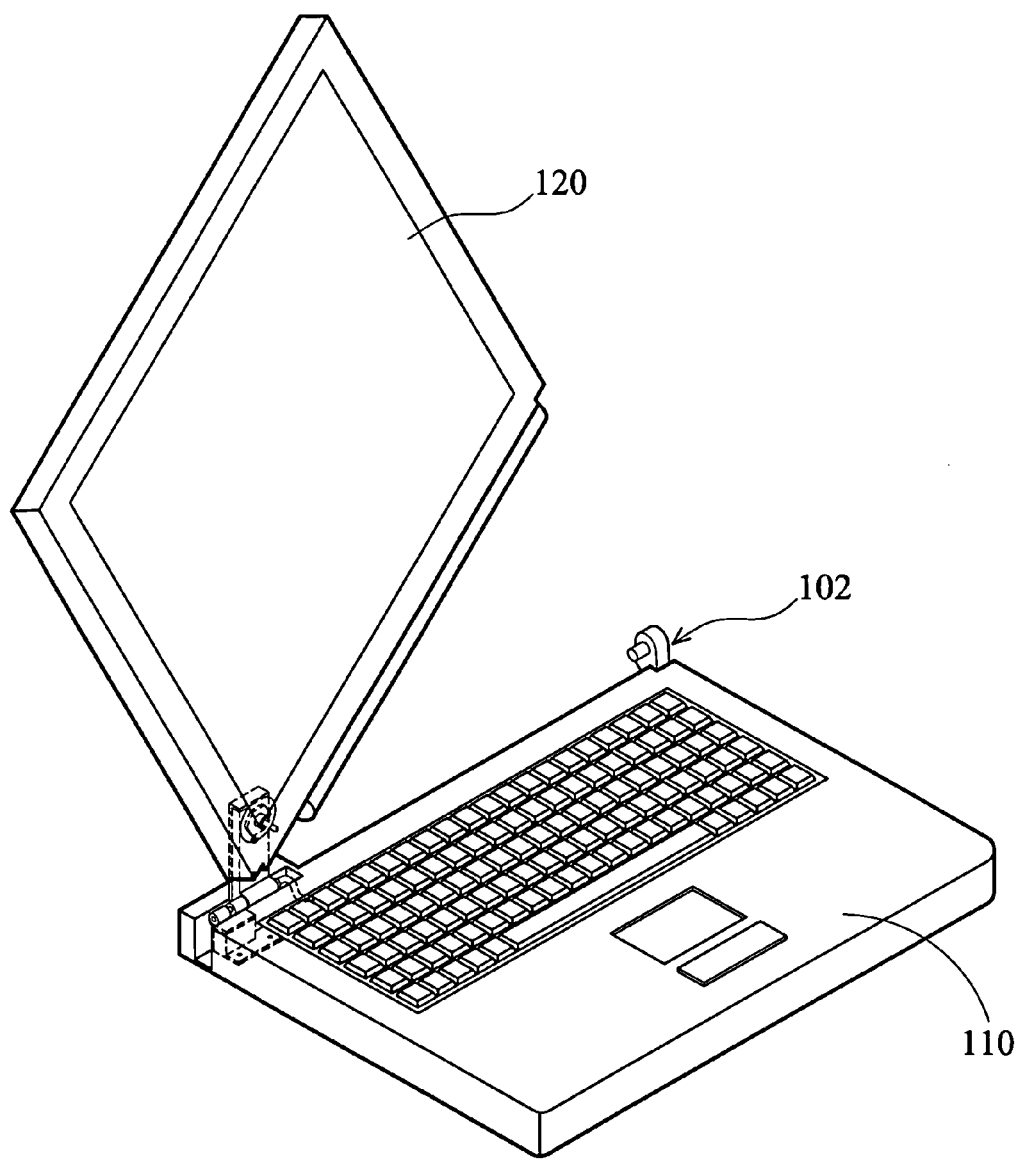
FIG. 4 is a schematic perspective view showing operation of the notebook computer (electronic device) of the invention.

In another aspect, when the button of the release/lock hinge 102 is pressed, one end of the LCD monitor 120 can be separated from the release/lock hinge 102 (or host 110), as shown in FIG. 4. The LCD monitor 120 can then be rotated counterclockwise (the LCD monitor 120 rotates in the second direction B with respect to the rotating base 140 by way of the second pivot 142 and the rotating base 140 remains stationary) to a position shown in FIG. 5. At this point, the LCD monitor 120 is beside the host 110 and an additional monitor M can be connected to the host 110. The LCD monitor 120 and monitor M can together serve as operating interfaces, or only the monitor M serves as an operating interface. Moreover, during rotation of the LCD monitor 120, the rotating position and angle of the LCD monitor 120 can be definitely obtained by alternate operation of the first positioning member 150 and second positioning member 160.

Figure 5:
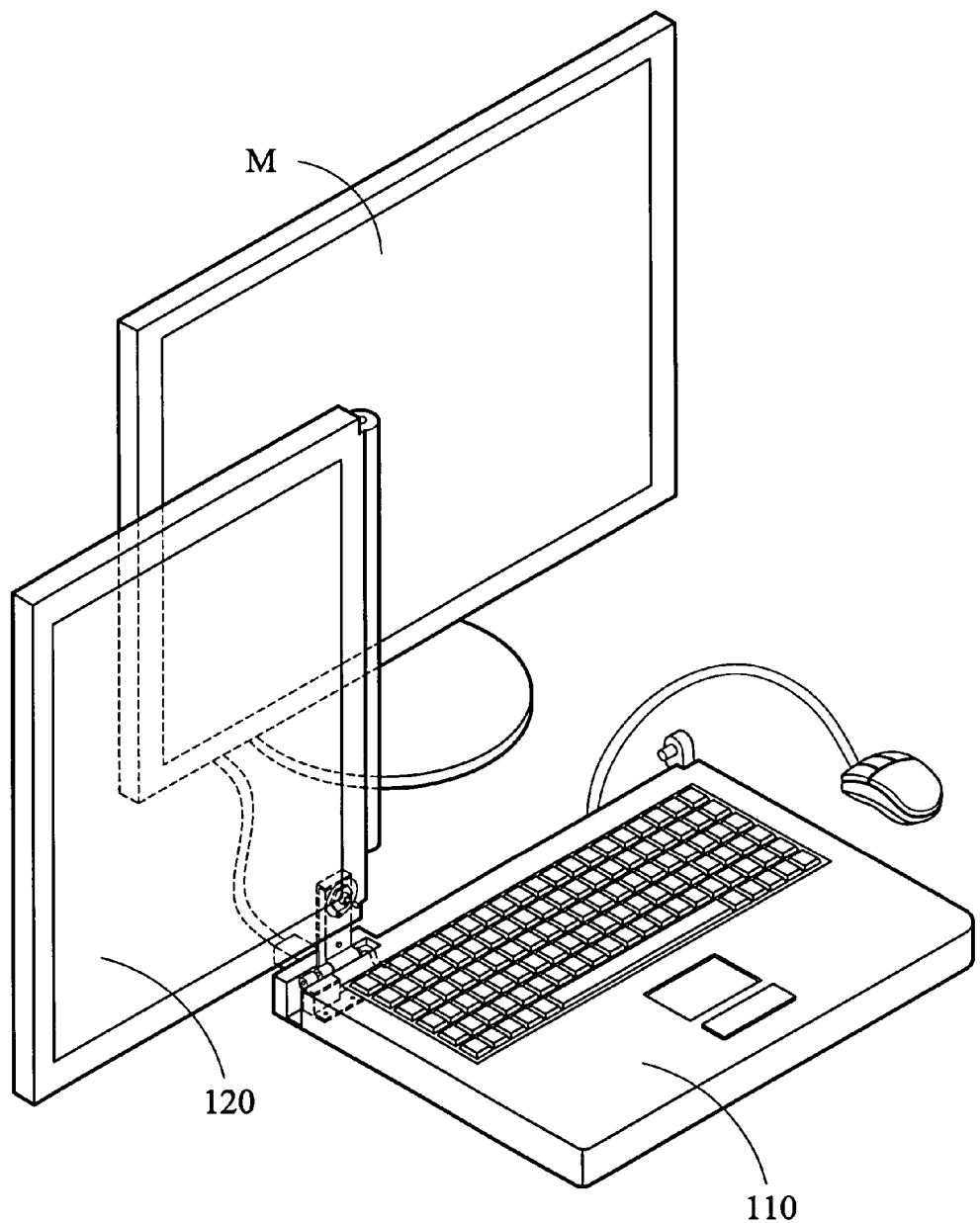
FIG. 5 is another schematic perspective view showing operation of the notebook computer (electronic device) of the invention.

Accordingly, when rotating to the position shown in FIG. 5, the LCD monitor 120 can be turned, adjusting inclination thereof. Specifically, the inclination of the LCD monitor 120 is adjusted by turning the LCD monitor 120 to rotate the rotating base 140 in the first direction A.

Moreover, the disclosed notebook computer is not limited to a conventional release/lock hinge. Namely, the LCD monitor can be connected to the host by only the aforementioned rotating mechanism, with open and close operations of the LCD monitor and host not adversely affected.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a host;
a fixed base fixed to the host;
a rotating base rotatably connected to the fixed base and comprising a first pivot and a second pivot, wherein the first pivot is disposed in the fixed base and separated from the second pivot, the central axis of the first pivot is perpendicular to that of the second pivot, and the rotating base rotates in a first direction with respect to the fixed base by way of the first pivot;
a monitor rotatably connected to the rotating base, wherein the second pivot of the rotating base is disposed in the monitor, the monitor rotates in a second direction with respect to the rotating base by way of the second pivot, and the central rotating axis of the second direction is perpendicular to that of the first direction;
a first positioning member fit on the second pivot of the rotating base and fixed to the monitor; and
a second positioning member fit on and fixed to the second pivot of the rotating base and abutting the first positioning member, wherein the first and second positioning members position the rotating position and angle of the monitor when the monitor rotates in the second direction with respect to the rotating base by way of the second pivot.

2. The electronic device as claimed in claim 1, wherein the first positioning member comprises a plurality of recesses, the second positioning member comprises at least one protrusion, and one of the recesses selectively engages the protrusion when the monitor rotates in the second direction with respect to the rotating base by way of the second pivot.

3. The electronic device as claimed in claim 2, wherein the recesses are circularly arranged on the first positioning member.

4. The electronic device as claimed in claim 1, wherein the first positioning member comprises at least one protrusion, the second positioning member comprises a plurality of recesses, and the protrusion selectively engages one of the recesses when the monitor rotates in the second direction with respect to the rotating base by way of the second pivot.

5. The electronic device as claimed in claim 4, wherein the recesses are circularly arranged on the second positioning member.

6. The electronic device as claimed in claim 1, wherein the first positioning member comprises at least one recess, the second positioning member comprises a plurality of protrusions, and the recess selectively engages one of the protrusions when the monitor rotates in the second direction with respect to the rotating base by way of the second pivot.

7. The electronic device as claimed in claim 6, wherein the protrusions are circularly arranged on the second positioning member.

8. The electronic device as claimed in claim 1, wherein the first positioning member comprises a plurality of protrusions, the second positioning member comprises at least one recess, and one of the protrusions selectively engages the recess when the monitor rotates in the second direction with respect to the rotating base by way of the second pivot.

9. The electronic device as claimed in claim 8, wherein the protrusions are circularly arranged on the first positioning member.

10. The electronic device as claimed in claim 1, wherein the rotating base is hollow, and the monitor is electrically connected to the host by way of a signal cable passing through the rotating base.

11. The electronic device as claimed in claim 10, wherein the second pivot of the rotating base is hollow, and the monitor is electrically connected to the host by way of the signal cable passing through the second pivot and rotating base.

12. The electronic device as claimed in claim 1, further comprising a holding washer and a nut, wherein the holding washer fits on the second pivot of the rotating base and is adjacent to the second positioning member, and the nut is screwed to the second pivot of the rotating base and abuts the holding washer.

13. The electronic device as claimed in claim 1, wherein the fixed base comprises a pivot hole in which the first pivot of the rotating base is disposed.

14. The electronic device as claimed in claim 1, further comprising a shield fitted on the second pivot of the rotating base, wherein the shield is disposed between the rotating base and the monitor and fixed to the monitor.

15. The electronic device as claimed in claim 1, wherein the monitor comprises an LCD monitor.

16. The electronic device as claimed in claim 1, wherein the electronic device comprises a notebook computer.

* * * * *